2,986,448
PREPARATION OF SODIUM PERCARBONATE
William H. Gates, Whippany, Robert L. Harris, Morris Township, Morris County, and James S. MacKenzie, Parsippany, N.J., assignors to Allied Chemical Corporation, New York, N.Y., a corporation of New York
Filed Dec. 18, 1958, Ser. No. 781,220
5 Claims. (Cl. 23—62)

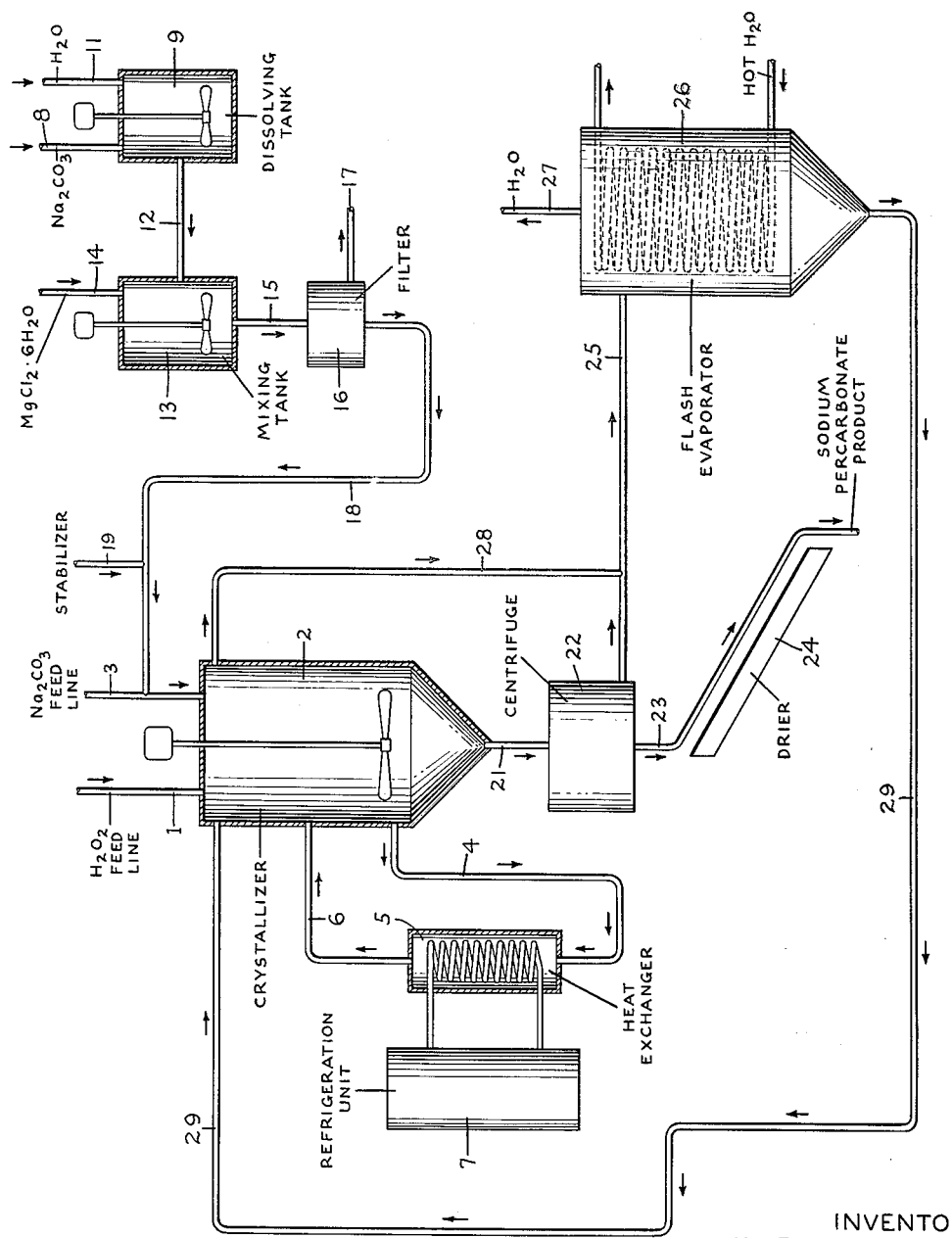

This invention relates to the preparation of sodium percarbonate by reaction of hydrogen peroxide with sodium carbonate.

Sodium percarbonate has been found particularly useful in the formulation of household safety bleaches and detergents. It also may be employed as an additive to abrasive cleansers. In all of these applications, it is essential that the sodium percarbonate have a high active oxygen content and excellent stability.

It is well known that sodium percarbonate may be prepared by the reaction of hydrogen peroxide with sodium carbonate in aqueous medium, as represented by the following equation:

$$2Na_2CO_3 + 3H_2O_2 \rightarrow 2Na_2CO_3 \cdot 3H_2O_2$$

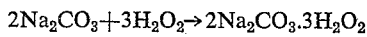

However, presently available processes are usually characterized by low yields and/or the production of sodium percarbonate of inferior quality with respect to active oxygen content and stability.

The object of the present invention is to produce sodium percorbonate in high yield and quality from hydrogen peroxide and sodium carbonate.

A more specific object of the present invention is to provide a closed, cyclic process for production of high quality sodium percarbonate in excellent yield from hydrogen peroxide and sodium carbonate.

Other objects and advantages of the invention will appear hereinafter.

According to the present invention, excellent yields of high quality sodium percarbonate may be produced by a closed, cyclic process which comprises treating in a crystallization zone an aqueous reaction mixture containing hydrogen peroxide and sodium carbonate at temperature not above about 5° C. for a period of at least about 4 hours, removing the resulting slurry of sodium percarbonate crystals from the crystallization zone, filtering the slurry to separate the sodium percarbonate crystals, drying the sodium percarbonate crystals so obtained to produce sodium percarbonate product, subjecting the mother liquor containing dissolved sodium percarbonate from the aforesaid filtration to rapid flash evaporation under such conditions that excess water is removed from the system and recycling the concentrated mother liquor to the aforesaid crystallization zone.

The closed, cyclic process of the present invention, characterized by simplicity and high efficiency, produces yields of at least about 85% of sodium percarbonate product having an active oxygen content of at least about 14.0%. In addition, uniform, large crystals of sodium percarbonate, favoring product stability, are formed.

Generally speaking, the hydrogen peroxide and sodium carbonate are reacted in the proportions corresponding to at least 1.5, e.g. 1.5 to 1.6, mols of hydrogen peroxide per mol of sodium carbonate. The hydrogen peroxide reactant is introduced directly into the crystallization zone in the form of an aqueous solution, preferably having a concentration of about 50 to 90 weight percent of hydrogen peroxide.

The sodium carbonate reactant is preferably added to the system as a saturated aqueous solution. Addition of solid sodium carbonate to the crystallization zone has been found to lead to low yields and the production of unstable sodium percarbonate.

The combined value of hydrogen peroxide and sodium carbonate concentration must exceed the solubility product of sodium percarbonate at the operating temperature (e.g. 10.8% at 5° C.). Efficient operation is realized by maintaining the water content of the reaction mixture within the range of about 56 to 89 weight percent, and preferably about 56 to 70 weight percent. When substantially lower amounts of water than the specified minimum are employed, the product obtained has been found to be deficient in the following respects: (1) the moisture content is too high, (2) the drying time is excessively long, (3) the resultant product does not have the desired minimum active oxygen content of about 14.0% and (4) the dried crystals are small, and non-uniform and tend to aggregate in lumps. When amounts of water higher than the specified maximum amount are employed, excessive quantities of sodium percarbonate product remain in solution in the reaction mixture, thereby causing increased process difficulties and additional operating expense.

Further, in order to attain the desired results of the present invention, the reaction of hydrogen peroxide and sodium carbonate must be carried out at a temperature of about 5° C. or less, and preferably at a temperature of about 0° to 5° C. Use of substantially higher temperatures than the maximum of about 5° C. have been found to result in excessive solubility of sodium percarbonate in the reaction mixture with its attendant disadvantages. Desired crystallization temperature may be conveniently maintained by withdrawing a predetermined quantity of supernatant mother liquor from the crystallization zone, cooling the liquor in a cooling zone to a temperature below 5° C., preferably to a temperature of about —2° to 2° C., and recirculating the cooled liquor to the crystallization zone.

It is also necessary to carry out the process of the present invention for a period of at least about 4 hours, preferably about 6 to 12 hours. Although the process is not limited to any maximum reaction period, economic factors indicate that reaction times greater than about 12 hours are undesirable.

A closed, cyclic system characterized by excellent yields of high quality sodium percarbonate is made possible in the present invention by removing water present in the charge materials from the system. In view of the known rapid losses of active oxygen content of sodium percarbonate solutions, a special procedure for such water removal has been developed. According to this procedure, removal of water is accomplished by subjecting mother liquor, separated from sodium percarbonate crystalline product but containing dissolved sodium percarbonate, to rapid flash evaporation under highly specific conditions. This flash evaporation step is carried out at a temperature of about 25° to 50° C., preferably about 30° to 40° C. and under pressure of about 25 to 100 mm. Hg, preferably about 35 to 40 mm. Hg, for a residence time of not more than about 10 minutes, preferably not more than about 3 minutes. The amount of water removed in the evaporation step is that calculated to maintain the water content of the reaction mixture in the crystallization zone approximately constant. The concentrated mother liquor, generally in the form of a slurry, is then recycled to the crystallization zone.

The recycled slurry contains sodium percarbonate of fine crystalline structure and, hence, of low stability. However, we have discovered that when additional hydrogen peroxide and sodium carbonate are reacted in the crystallization zone, the crystals actually grow in size and become stable.

The accompanying drawing shows a flow sheet of one embodiment of the process of the present invention carried out in continuous manner.

Referring to the drawing, aqueous hydrogen peroxide, preferably having a hydrogen peroxide weight concentration of about 50 to 90%, is fed through line 1 to conventional crystallizer 2 provided with an agitator. Alternatively, an Oslo-type classifying crystallizer may be used. In this type of crystallizer, a supersaturated circulating solution flows up through a bed of forming and growing crystals and provides a classifying action. Sodium carbonate, preferably in the form of a saturated aqueous solution, prepared as described below, is introduced into crystallizer 2 via line 3. Addition of the sodium carbonate solution is made either simultaneously with or subsequent to the hydrogen peroxide addition. The hydrogen peroxide and sodium carbonate are generally employed in mol ratios at least about 1.5:1. The reaction mixture in crystallizer 2, containing usually about 56 to 89% by weight of water, is held with agitation at a temperature of not more than about 5° C. and preferably about 0° to 5° C. for a period of at least about 4 hours, to form a slurry of sodium percarbonate crystals. The sodium percarbonate crystals settle to the bottom of crystallizer 2. The temperature of the crystallizer liquor is controlled by withdrawing supernatant liquor from crystallizer 2 through line 4, cooling the liquor in heat exchanger 5 to a temperature below 5° C., preferably to a temperature of about $-2°$ to 2° C., and recirculating the cooled liquor via line 6 to crystallizer 2. The coolant, e.g., a glycol brine, circulating through heat exchanger 5, is obtained from refrigeration unit 7.

Saturated aqueous sodium carbonate solution is obtained in the following manner. Sodium carbonate, in anhydrous or crystalline form, is introduced through line 8 to dissolving tank 9 provided with an agitator. Water, in sufficient amount to form a saturated solution of sodium carbonate, is introduced to dissolving tank 9 via line 11, and agitation is employed to effect dissolution of the sodium carbonate.

The saturated aqueous sodium carbonate solution formed in tank 9 is fed through line 12 to magnesium chloride mixing tank 13 provided with an agitator. In tank 13, magnesium chloride hexahydrate ($MgCl_2 \cdot 6H_2O$) is added via line 14 in an amount equivalent to about 0.5 to 1.5% of the weight of the sodium percarbonate product, while agitating the tank contents. The addition of the magnesium chloride to the sodium carbonate solution forms magnesium carbonate which is fluocculent and removes iron from the solution. Removal of iron is essential for stability of the product since iron impurity of more than 5 parts per million has been found to adversely affect product stability.

The magnesium chloride-treated liquor is passed from tank 13 via line 15 to conventional filter 16 where fluocculent magnesium carbonate is removed through line 17. The solution leaves filter 16 through line 18. A solution of a suitable stabilizer, such as sodium silicate, is added to line 18 through line 19. The amount of sodium silicate added is about stoichiometrically equivalent to the magnesium chloride previously added. The sodium silicate reacts with the magnesium in the solution to form a suspension of magnesium silicate. The suspension gives the desired stability to the sodium percarbonate product subsequently obtained. Adequate mixing of sodium silicate with the mother liquor is provided by any constriction or orifice (not shown) in line 18 which produces turbulence.

The stabilized saturated aqueous sodium carbonate solution is then introduced into crystallizer 2 via line 3, as previously described.

Uniform, large crystals of sodium percarbonate are continuously withdrawn from the bottom of crystallizer 2 via line 21 in a slurry of mother liquor containing from about 20 to 40% suspended solids by weight. The slurry of crystals is introduced into conventional centrifuge 22. In centrifuge 22, mother liquor is removed from the crystals, thereby reducing the moisture content of the crystals to about 2 to 10%. It is important that the moist product be removed from the centrifuge into a drying unit as quickly as possible to reduce decomposition losses i.e., loss of active oxygen content. If desired, other filtration means, such as rotary filters or filter presses may be employed.

The centrifuged product crystals are withdrawn through line 23 and dried in drier 24, e.g., at a temperature of about 40° to 50° C., to obtain dry sodium percarbonate product. Drier 24 may conveniently be a vacuum oven or a warm air drier.

Closed, cyclic operation is permitted by removing from the system a weight of water aproximately equivalent to the water in the charge materials (allowing for process loss of about 2–3%), thereby maintaining the content of water in the crystallizer approximately constant. If sodium carbonate monohydrate is used in place of anhydrous sodium carbonate, additional water represented by the monohydrate must also be removed. A small amount of the excess water in the system is removed during drying of the centrifuged product in drier 24. Removal of the preponderant amount of excess water is accomplished by passing the mother liquor from centrifuge 22 via line 25 to conventional flash evaporator 26 which, as shown, is heated by means of coils through which hot water is circulated. The mother liquor entering flash evaporator 26 is subjected to a temperature of about 25° to 50° C., preferably about 30° to 40° C., under a pressure of about 25 to 100 mm. Hg, preferably about 35 to 40 mm. Hg, for a residence time of not more than about 10 minutes, preferably not more than about 3 minutes (e.g. about 2 to 3 minutes), to remove the desired amount of excess water from the system. Water is removed from evaporator 26 as overhead through line 27. If the amount of mother liquor from the centrifuge is inadequate for removal of the required amount of water from the system, it may be combined with sufficient supernatant, crystallizer mother liquor. The supernatant mother liquor is removed from the top of crystallizer 2 through line 28 and combined in line 25 with the mother liquor from centrifuge 22. The combined liquors are then passed to evaporator 26 for removal of the required amount of water from the system. Concentrated mother liquor, usually in the form of a slurry, is returned at evaporator temperature directly to crystallizer 2 via line 29. The fine crystals of sodium percarbonate present in the slurry become large, stable crystals upon reaction of additional hydrogen peroxide and sodium carbonate charges in the crystallizer.

When a series of runs is carried out, the average yield of sodium percarbonate product is at least about 85%. The product is a highly stable crystalline material which has an active oxygen content of at least about 14.0% and exhibits a loss of oxygen at 50° C. of less than 0.5% per week.

Although the process of the present invention may be carried out in batch as well as continuous manner, the continuous process is preferred for obvious reasons of efficiency and economy.

The process of the present invention may be illustrated by the following specific example taken in connection with the accompanying flow diagram of the process.

894 cc. of aqueous hydrogen peroxide (51.8%) is charged to crystallizer 2. 2700 cc. of aqueous sodium carbonate solution (34.7%) is added simultaneously to the hydrogen peroxide. The mol ratio of hydrogen peroxide to sodium percarbonate is about 1.5 to 1. Before addition, the sodium carbonate solution is treated with 4 grams of magnesium chloride hexahydrate to remove iron impurities. The reaction mixture is held in the crystallizer at a temperature of about 4° C. for a period of about 6 hours. During the course of the reaction, 0.5% by weight (based on sodium percarbonate product) magnesium silicate, formed in situ by reaction of magnesium chloride hexahydrate and sodium silicate, is added to the crystallizer.

At the completion of the reaction, a slurry of uniform, large crystals of sodium percarbonate is obtained. About two-thirds of the slurry is then centrifuged. The centrifuged material is dried in a vacuum oven at a temperature of 40–45° C. to yieldl 679 grams of highly stable sodium percarbonate having an active oxygen content of about 15.1%.

The mother liquor obtained from the centrifuge amounting to 2127 cc. is fed to flash evaporator 26 where the liquor is evaporated at a temperature of 30–40° C. and under a pressure of 35–40 mm. Hg for a period of about 3 minutes. 1100 cc. of water is removed as overhead. The resultant slurry is recycled to the crystallizer which contains the remaining one-third of the original reaction slurry. To the combined slurries are added fresh hydrogen peroxide and sodium carbonate, in mol ratio of about 1.5 mols of hydrogen peroxide to 1 mol of sodium carbonate. The mixture is held in the crystallizer at a temperature of about 4° C. for a period of about 6 hours to form additional sodium percarbonate. Sodium percarbonate product is recovered in the manner described above.

Upon repeating the above sequence of events several times, there is obtained a dry, highly stable sodium percarbonate product having an average yield of about 85% and an average oxygen content of about 14.9%. The product exhibits a loss of active oxygen at 50° C. of less than 0.5% per week.

Although certain preferred embodiments of the invention have been disclosed for the purpose of illustration, it will be evident that various changes and modifications may be made therein without departing from the scope and spirit of the invention.

We claim:

1. A closed, cyclic process for the production of uniform, large crystals of sodium percarbonate which comprises treating an aqueous reaction mixture in a crystallization zone containing hydrogen peroxide and sodium carbonate at temperature not above about 5° C. for a period of at least about 4 hours, removing resulting crystalline slurry of sodium percarbonate from said crystallization zone, filtering said crystalline slurry, drying the sodium percarbonate crystals so obtained to produce sodium percarbonate product, subjecting the mother liquor containing dissolved sodium percarbonate from the aforesaid filtration to rapid flash evaporation under such conditions that excess water is removed from the system and a slurry containing fine crystals of sodium percarbonate is formed, and recycling the slurry so formed, together with additional hydrogen peroxide and sodium carbonate reactants, to the aforesaid crystallization zone.

2. A closed, cyclic process for the production of uniform, large crystals of sodium percarbonate which comprises treating in a crystallization zone an aqueous reaction mixture containing (1) hydrogen peroxide and (2) sodium carbonate, in ratio of at least about 1.5 mols of hydrogen peroxide per mol of sodium carbonate, at temperature not above about 5° C. for a period of at least about 4 hours, removing resulting crystalline slurry of sodium percarbonate from said crystallization zone, filtering said crystalline slurry, drying the sodium percarbonate crystals so obtained to produce sodium percarbonate product, subjecting the mother liquor containing dissolved sodium percarbonate from the aforesaid filtration to rapid flash evaporation under such conditions that excess water is removed from the system and a slurry containing fine crystals of sodium percarbonate is formed, and recycling the slurry so formed, together with additional hydrogen peroxide and sodium carbonate reactants, to the aforesaid crystallization zone.

3. A closed, cyclic process for the production of uniform, large crystals of sodium percarbonate which comprises treating in a crystallization zone an aqueous reaction mixture containing hydrogen peroxide and sodium carbonate at temperature not above 5° C. for a period of at least about 4 hours, removing resulting crystalline slurry of sodium percarbonate from said crystallization zone, filtering said crystalline slurry, drying the sodium percarbonate crystals so obtained to produce sodium percarbonate product, subjecting the mother liquor containing dissolved sodium percarbonate from the aforesaid filtration to flash evaporation at temperature of about 25° to 50° C. and under pressure of about 25 to 100 mm. Hg for a residence period of about 2 to 10 minutes to remove excess water from the system and a slurry containing fine crystals of sodium percarbonate is formed, and recycling the slurry so formed, together with additional hydrogen peroxide and sodium carbonate reactants, to the aforesaid crystallization zone.

4. A closed, cyclic process for the production of uniform, large crystals of sodium percarbonate which comprises treating in a crystallization zone an aqueous reaction mixture containing hydrogen peroxide and sodium carbonate at temperature of about 0° to 5° C. for a period of at least about 4 hours, removing resulting crystalline slurry of sodium percarbonate from said crystallization zone, filtering said crystalline slurry, drying the sodium percarbonate crystals so obtained to produce sodium percarbonate product, subjecting the mother liquor containing dissolved sodium percarbonate from said filtration to flash evaporation at temperature of about 30° to 40° C. and under pressure of about 35 to 40 mm. Hg for a residence period of not more than about 3 minutes to remove excess water from the system and a slurry containing fine crystals of sodium percarbonate is formed and recycling the slurry so formed, together with additional hydrogen peroxide and sodium carbonate reactants, to the aforesaid crystallization zone.

5. A closed, cyclic process for the production of uniform, large crystals of sodium percarbonate which comprises charging to a crystallization zone (1) an aqueous hydrogen peroxide solution having a concentration of about 50 to 90% of hydrogen peroxide and (2) a saturated aqueous solution of sodium carbonate, in ratio of at least about 1.5 mols of hydrogen peroxide to one mol of sodium carbonate, maintaining the charged materials at temperature of about 0° to 5° C. for a period of at least about 4 hours, removing resulting crystalline slurry of sodium percarbonate from said crystallization zone, centrifuging said crystalline slurry, drying the sodium percarbonate crystals so obtained to produce sodium percarbonate product, subjecting the mother liquor containing dissolved sodium percarbonate from said centrifuging step to flash evaporation at temperature of about 30° to 40° C. and under a pressure of about 35 to 40 mm. Hg for a residence time of not more than about 3 minutes to remove excess water from the system and a slurry containing fine crystals of sodium percarbonate is formed and recycling the slurry so formed, together with additional hydrogen peroxide and sodium carbonate reactants, to the aforesaid crystallization zone.

References Cited in the file of this patent

UNITED STATES PATENTS 2,541,733    Young    Feb. 13, 1951
2,737,451    Saeman    Mar. 6, 1956

OTHER REFERENCES

A.P.C., application of Pressel et al., Ser. No. 375,666, published Apr. 27, 1943, now abandoned.